US006941138B1

(12) United States Patent
Chang et al.

(10) Patent No.: US 6,941,138 B1
(45) Date of Patent: Sep. 6, 2005

(54) CONCURRENT COMMUNICATIONS BETWEEN A USER TERMINAL AND MULTIPLE STRATOSPHERIC TRANSPONDER PLATFORMS

(75) Inventors: Donald C. D. Chang, Thousand Oaks, CA (US); Alan Cha, Glendale, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 613 days.

(21) Appl. No.: 09/655,498

(22) Filed: Sep. 5, 2000

(51) Int. Cl.[7] .............................................. H04Q 7/20
(52) U.S. Cl. ..................... 455/427; 455/12.1; 455/430; 455/431
(58) Field of Search ................................ 455/427–430, 455/431, 12.1, 13.1, 13.2, 13.3; 244/24, 31, 158 R

(56) References Cited

U.S. PATENT DOCUMENTS

| | | | |
|---|---|---|---|
| 2,470,787 A | 5/1949 | Nosker | 342/12 |
| 2,763,857 A | 9/1956 | Valley | |
| 2,821,704 A | 1/1958 | O'Day | |
| 3,254,341 A | 5/1966 | Brossaud | |
| 3,384,891 A | 5/1968 | Anderson | 343/100 |
| 3,541,553 A | 11/1970 | Gubin | |
| 3,544,995 A | 12/1970 | Bottenburg et al. | 343/6 |
| 3,593,138 A | 7/1971 | Dunn et al. | |
| 3,611,435 A | 10/1971 | Cooper | |
| 3,665,464 A | 5/1972 | Meilander | |
| 3,668,403 A | 6/1972 | Meilander | |
| 3,720,953 A | 3/1973 | Ajioka | |
| 3,742,498 A | 6/1973 | Dunn | |
| 3,982,075 A | 9/1976 | Jefferis et al. | |
| 4,019,138 A | 4/1977 | Watanabe et al. | |
| 4,085,368 A | 4/1978 | Yeh | |
| 4,161,730 A | 7/1979 | Anderson | 342/352 |
| 4,161,734 A | 7/1979 | Anderson | 342/352 |
| 4,181,886 A | 1/1980 | Cooperman | |
| 4,236,161 A | 11/1980 | Ohm | |
| 4,343,005 A | 8/1982 | Han et al. | |
| 4,359,733 A | 11/1982 | O'Neill | 343/6.5 |
| 4,555,782 A | 11/1985 | Alaria et al. | |
| 4,613,864 A | 9/1986 | Hofgen | 343/357 |
| 4,635,063 A | 1/1987 | Chang et al. | 342/380 |

(Continued)

FOREIGN PATENT DOCUMENTS

| EP | 0 335 558 | 4/1989 |
|---|---|---|
| EP | 0 549 220 A2 | 6/1993 |

(Continued)

OTHER PUBLICATIONS

U.S. Appl. No. 09/539,964, filed Mar. 31, 2000, Rosen et al.
U.S. Appl. No. 09/566,759, filed May. 5, 2000, Novak et al.

(Continued)

*Primary Examiner*—Quochien B. Vuong
(74) *Attorney, Agent, or Firm*—Georgann S. Grunebach

(57) ABSTRACT

A method for communicating between a user terminal and multiple stratospheric transponder platforms includes the steps of positioning a plurality of stratospheric transponder platforms (102, 104, 106, 108) in a substantially fixed position (152) with respect to a user terminal antenna (116) coupled to a user terminal (117) and communicating between the user terminal (117) and at least two of the plurality of stratospheric transponder platforms (102, 104, 106, 108) concurrently.

80 Claims, 7 Drawing Sheets

U.S. PATENT DOCUMENTS

| | | |
|---|---|---|
| 4,689,625 A | 8/1987 | Barmat |
| 4,722,083 A | 1/1988 | Tirro et al. |
| 4,727,503 A | 2/1988 | McWhirter |
| 4,758,959 A | 7/1988 | Thoone et al. |
| 4,797,170 A | 1/1989 | Gilhousen et al. |
| 4,799,065 A | 1/1989 | Thompson |
| 4,812,788 A | 3/1989 | Wong et al. |
| 4,819,227 A | 4/1989 | Rosen .......................... 370/75 |
| 4,823,341 A | 4/1989 | Rosen |
| 4,897,661 A | 1/1990 | Hiraiwa ..................... 342/457 |
| 4,901,307 A | 2/1990 | Gilhousen et al. |
| 4,994,809 A | 2/1991 | Yung et al. ................. 342/108 |
| 5,006,855 A | 4/1991 | Braff .......................... 342/357 |
| 5,017,927 A | 5/1991 | Agrawal et al. ............ 342/371 |
| 5,077,562 A | 12/1991 | Chang et al. ............... 342/368 |
| 5,077,759 A | 12/1991 | Nakahara |
| 5,081,464 A | 1/1992 | Renshaw |
| 5,097,269 A | 3/1992 | Takayama et al. |
| 5,099,245 A | 3/1992 | Sagey ........................ 342/357 |
| 5,109,390 A | 4/1992 | Gilhousen et al. |
| 5,111,209 A | 5/1992 | Toriyama .................... 342/357 |
| 5,126,748 A | 6/1992 | Ames et al. ................. 342/353 |
| 5,151,706 A | 9/1992 | Roederer et al. |
| 5,181,041 A | 1/1993 | Lind et al. |
| 5,187,485 A | 2/1993 | Tsui et al. |
| 5,218,619 A | 6/1993 | Dent |
| 5,233,626 A | 8/1993 | Ames ............................. 375/1 |
| 5,257,030 A | 10/1993 | Aoki et al. |
| 5,278,863 A | 1/1994 | Briskman ....................... 375/1 |
| 5,319,673 A | 6/1994 | Briskman ....................... 375/1 |
| 5,327,455 A | 7/1994 | De Gaudenzi et al. |
| 5,339,330 A | 8/1994 | Millinckrodt |
| 5,361,398 A | 11/1994 | Christian et al. |
| 5,365,239 A | 11/1994 | Stilwell, Jr. |
| 5,365,447 A | 11/1994 | Dennis |
| 5,379,320 A | 1/1995 | Fernandes et al. |
| 5,387,916 A | 2/1995 | Cohn .......................... 342/44 |
| 5,408,237 A | 4/1995 | Patterson et al. |
| 5,410,314 A | 4/1995 | Frush et al. .................. 342/26 |
| 5,416,808 A | 5/1995 | Witsaman et al. |
| 5,423,058 A | 6/1995 | Cudak et al. |
| 5,423,059 A | 6/1995 | LoGalbo et al. |
| 5,428,814 A | 6/1995 | Mort et al. |
| 5,444,449 A | 8/1995 | Poskett et al. |
| 5,444,450 A | 8/1995 | Olds et al. .................. 342/357 |
| 5,467,282 A | 11/1995 | Dennis |
| 5,475,520 A | 12/1995 | Wissinger |
| 5,485,485 A | 1/1996 | Briskman et al. ........... 375/200 |
| 5,510,797 A | 4/1996 | Abraham et al. |
| 5,525,995 A | 6/1996 | Benner ........................ 342/90 |
| 5,550,809 A | 8/1996 | Bottomley et al. |
| 5,552,798 A | 9/1996 | Dietrich et al. |
| 5,555,257 A | 9/1996 | Dent |
| 5,555,444 A | 9/1996 | Diekelman et al. |
| 5,568,484 A | 10/1996 | Margis |
| 5,572,216 A | 11/1996 | Weinberg et al. |
| 5,584,047 A | 12/1996 | Tuck |
| 5,586,121 A | 12/1996 | Moura et al. |
| 5,589,834 A | 12/1996 | Weinberg et al. |
| 5,592,471 A | 1/1997 | Briskman .................. 455/52.3 |
| 5,592,481 A | 1/1997 | Wiedeman et al. |
| 5,594,941 A | 1/1997 | Dent |
| 5,608,722 A | 3/1997 | Miller |
| 5,612,701 A | 3/1997 | Diekelman .................. 342/54 |
| 5,613,219 A | 3/1997 | Vogel et al. |
| 5,617,410 A | 4/1997 | Matsumoto |
| 5,625,640 A | 4/1997 | Palmer et al. |
| 5,625,864 A | 4/1997 | Budow et al. |
| 5,644,572 A | 7/1997 | Olds et al. .................. 370/324 |
| 5,652,597 A | 7/1997 | Caille |
| 5,659,350 A | 8/1997 | Hendricks et al. |
| 5,661,582 A | 8/1997 | Kintis et al. |
| 5,678,174 A | 10/1997 | Yeung et al. |
| 5,682,195 A | 10/1997 | Hendricks et al. |
| 5,684,799 A | 11/1997 | Bigham et al. |
| 5,696,766 A | 12/1997 | Yeung et al. |
| 5,708,961 A | 1/1998 | Hylton et al. |
| 5,710,652 A | 1/1998 | Bloom et al. |
| 5,715,516 A | 2/1998 | Howard et al. |
| 5,717,737 A | 2/1998 | Doviak et al. |
| 5,727,065 A | 3/1998 | Dillon |
| 5,729,279 A | 3/1998 | Fuller |
| 5,732,351 A | 3/1998 | Olds et al. |
| 5,739,785 A | 4/1998 | Allison et al. ............... 342/357 |
| 5,754,139 A | 5/1998 | Turcotte et al. |
| 5,764,187 A | 6/1998 | Rudish et al. |
| 5,764,188 A | 6/1998 | Ghosh et al. |
| 5,790,070 A | 8/1998 | Natarajan et al. |
| 5,790,071 A | 8/1998 | Silverstein et al. |
| 5,810,284 A | 9/1998 | Hibbs et al. |
| 5,818,395 A | 10/1998 | Wolcott et al. |
| 5,825,325 A | 10/1998 | O'Donovan et al. |
| 5,828,659 A | 10/1998 | Teder et al. |
| 5,839,053 A | 11/1998 | Bosch et al. |
| 5,852,721 A | 12/1998 | Dillon et al. |
| 5,856,804 A | 1/1999 | Turcotte et al. |
| 5,862,480 A | 1/1999 | Wild et al. |
| 5,864,579 A | 1/1999 | Briskman ................... 375/200 |
| 5,867,109 A | 2/1999 | Wiedeman et al. |
| 5,878,034 A | 3/1999 | Hershey et al. |
| 5,890,067 A | 3/1999 | Chang et al. |
| 5,894,590 A | 4/1999 | Vatt et al. |
| 5,903,549 A | 5/1999 | Von der Embse et al. |
| 5,907,813 A | 5/1999 | Johnson, Jr. et al. |
| 5,907,816 A | 5/1999 | Newman et al. |
| 5,909,460 A | 6/1999 | Dent |
| 5,909,470 A | 6/1999 | Barratt et al. |
| 5,912,642 A | 6/1999 | Coffin et al. |
| 5,915,207 A | 6/1999 | Dao et al. |
| 5,917,447 A | 6/1999 | Wang et al. ................. 342/383 |
| 5,918,157 A | 6/1999 | Wiedeman et al. |
| 5,920,284 A | 7/1999 | Victor .................... 342/357.01 |
| 5,937,332 A | 8/1999 | Karabinis |
| 5,943,331 A | 8/1999 | Lavean |
| 5,944,770 A | 8/1999 | Enge et al. .................. 701/707 |
| 5,945,948 A | 8/1999 | Buford et al. ............... 342/457 |
| 5,946,603 A | 8/1999 | Ibanez-Meier et al. |
| 5,946,625 A | 8/1999 | Hassan et al. |
| 5,949,766 A | 9/1999 | Ibanez-Meier et al. |
| 5,956,619 A | 9/1999 | Gallagher et al. |
| 5,963,175 A | 10/1999 | Burr |
| 5,963,862 A | 10/1999 | Adiwoso et al. |
| 5,966,371 A | 10/1999 | Sherman |
| 5,969,674 A | 10/1999 | Von Der Embse et al. .................... 342/357.16 |
| 5,973,647 A | 10/1999 | Barrett et al. ............... 343/713 |
| 5,974,039 A | 10/1999 | Schilling |
| 5,974,316 A | 10/1999 | Tayloe et al. |
| 5,974,317 A | 10/1999 | Djuknic et al. |
| 5,974,324 A | 10/1999 | Henson |
| 5,982,337 A | 11/1999 | Newman et al. |
| 5,983,113 A | 11/1999 | Asanuma |
| 5,990,839 A | 11/1999 | Schefte et al. |
| 5,990,928 A | 11/1999 | Sklar et al. |
| 5,991,329 A | 11/1999 | Lomp et al. |
| 5,995,725 A | 11/1999 | Dillon |
| 5,995,726 A | 11/1999 | Dillon |
| 6,002,916 A | 12/1999 | Lynch |
| 6,002,935 A | 12/1999 | Wang |
| 6,014,372 A | 1/2000 | Kent et al. |
| 6,016,124 A | 1/2000 | Lo et al. |

| | | | | | |
|---|---|---|---|---|---|
| 6,016,388 A | 1/2000 | Dillon | 6,304,354 B2 | 10/2001 | Carlson |
| 6,018,316 A | 1/2000 | Rudish et al. | 6,308,045 B1 | 10/2001 | Wright et al. |
| 6,019,318 A | 2/2000 | Cellier et al. | 6,311,068 B1 | 10/2001 | Leung et al. |
| 6,020,845 A | 2/2000 | Weinberg et al. | 6,314,269 B1 | 11/2001 | Hart et al. |
| 6,023,163 A | 2/2000 | Wiedeman et al. | 6,317,412 B1 | 11/2001 | Natali et al. |
| 6,028,884 A | 2/2000 | Silberger et al. | 6,317,420 B1 | 11/2001 | Schiff |
| 6,032,041 A | 2/2000 | Wainfan et al. | 6,324,381 B1 | 11/2001 | Anselmo et al. |
| 6,034,634 A | 3/2000 | Karlsson et al. | 6,324,398 B1 | 11/2001 | Lanzerotti et al. |
| 6,040,798 A | 3/2000 | Kinal et al. | 6,324,405 B1 | 11/2001 | Young et al. |
| 6,047,186 A | 4/2000 | Yu et al. | 6,325,332 B1 | 12/2001 | Cellier et al. |
| 6,058,308 A | 5/2000 | Kallin et al. | 6,327,523 B2 | 12/2001 | Cellier |
| 6,061,562 A | 5/2000 | Martin et al. | 6,333,924 B1 | 12/2001 | Porcelli et al. |
| 6,067,442 A | 5/2000 | Wiedeman et al. | 6,336,030 B2 | 1/2002 | Houston et al. |
| 6,067,453 A | 5/2000 | Adiwoso et al. | 6,336,612 B1 | 1/2002 | Taormina et al. |
| 6,072,986 A | 6/2000 | Blanchard et al. | 6,337,911 B1 | 1/2002 | Dillon |
| 6,084,510 A | 7/2000 | Lemelson et al. | 6,337,980 B1 | 1/2002 | Chang et al. |
| 6,084,892 A | 7/2000 | Benash et al. | 6,338,131 B1 | 1/2002 | Dillon |
| 6,088,341 A | 7/2000 | Hinedi et al. | 6,339,611 B1 | 1/2002 | Antonio et al. |
| 6,104,911 A | 8/2000 | Diekelman | 6,339,708 B1 | 1/2002 | Wang |
| 6,105,060 A | 8/2000 | Rothblatt | 6,340,947 B1 | 1/2002 | Chang et al. |
| 6,111,542 A | 8/2000 | Day et al. ................... 342/359 | 6,343,205 B1 | 1/2002 | Threadgill et al. |
| 6,118,824 A | 9/2000 | Smith et al. | 6,347,719 B1 | 2/2002 | Rosen et al. |
| 6,119,016 A | 9/2000 | Matusevich | 6,356,539 B1 | 3/2002 | Zuliani et al. |
| 6,125,261 A | 9/2000 | Anselmo et al. | 6,366,256 B1 | 4/2002 | Ramanujam et al. |
| 6,126,116 A | 10/2000 | Cellier | 6,366,761 B1 | 4/2002 | Montpetit |
| 6,138,012 A | 10/2000 | Krutz et al. ................. 455/427 | 6,374,080 B2 | 4/2002 | Uchida |
| 6,147,658 A | 11/2000 | Higashi et al. ............. 343/853 | 6,377,208 B2 | 4/2002 | Chang et al. |
| 6,150,977 A | 11/2000 | Wilcoxson et al. | 6,377,802 B1 | 4/2002 | McKenna et al. |
| 6,151,308 A | 11/2000 | Ibanez-Meier et al. | 6,380,893 B1 | 4/2002 | Chang et al. |
| 6,151,496 A | 11/2000 | Richards et al. | 6,381,228 B1 | 4/2002 | Prieto, Jr. et al. |
| 6,157,621 A | 12/2000 | Brown et al. | 6,385,434 B1 | 5/2002 | Chuprus et al. |
| 6,157,811 A | 12/2000 | Dent | 6,385,647 B1 | 5/2002 | Willis et al. |
| 6,160,994 A | 12/2000 | Wiedeman | 6,388,615 B1 | 5/2002 | Chang et al. |
| 6,161,141 A | 12/2000 | Dillon | 6,388,634 B1 | 5/2002 | Ramanujam et al. |
| 6,167,263 A | 12/2000 | Campbell | 6,389,336 B2 | 5/2002 | Cellier |
| 6,169,910 B1 | 1/2001 | Tamil et al. | 6,392,611 B1 | 5/2002 | Smith et al. |
| 6,173,178 B1 | 1/2001 | Hammill et al. | 6,396,819 B1 | 5/2002 | Fleeter et al. |
| 6,176,451 B1 | 1/2001 | Drymon | 6,397,078 B1 | 5/2002 | Kim |
| 6,178,328 B1 | 1/2001 | Tang et al. | 6,400,720 B1 | 6/2002 | Ovadia et al. |
| 6,188,896 B1 | 2/2001 | Perahia et al. | 6,400,925 B1 | 6/2002 | Tirabassi et al. |
| 6,195,037 B1 | 2/2001 | Gross et al. | 6,408,180 B1 | 6/2002 | McKenna et al. |
| 6,195,555 B1 | 2/2001 | Dent | 6,414,646 B2 | 7/2002 | Luh |
| 6,198,920 B1 | 3/2001 | Doviak et al. | 6,418,158 B1 | 7/2002 | Vishwanath et al. |
| 6,201,797 B1 | 3/2001 | Leuca et al. | 6,422,516 B1 | 7/2002 | Maeda et al. |
| 6,204,822 B1 | 3/2001 | Cardiasmenos et al. | 6,424,646 B1 | 7/2002 | Gerszberg et al. |
| 6,204,823 B1 | 3/2001 | Spano et al. | 6,424,831 B1 | 7/2002 | Schiff |
| 6,205,320 B1 | 3/2001 | Coleman | 6,429,823 B1 | 8/2002 | Bains et al. |
| 6,208,307 B1 | 3/2001 | Frisco et al. | 6,430,233 B1 | 8/2002 | Dillon et al. |
| 6,208,626 B1 | 3/2001 | Brewer | 6,430,394 B1 | 8/2002 | Boyden |
| 6,208,858 B1 | 3/2001 | Antonio et al. | 6,434,384 B1 | 8/2002 | Norin et al. |
| 6,215,776 B1 | 4/2001 | Chao | 6,438,379 B1 | 8/2002 | Gitlin et al. |
| 6,223,019 B1 | 4/2001 | Briskman et al. | 6,445,777 B1 | 9/2002 | Clark |
| 6,226,493 B1 | 5/2001 | Leopold | 6,452,541 B1 | 9/2002 | Zhao et al. |
| 6,229,477 B1 | 5/2001 | Chang et al. | 6,452,962 B1 | 9/2002 | Linsky et al. |
| 6,236,834 B1 | 5/2001 | Poskett et al. | 6,456,846 B2 | 9/2002 | Norin et al. |
| 6,240,072 B1 | 5/2001 | Lo et al. | 6,460,808 B2 | 10/2002 | Taormina et al. |
| 6,243,587 B1 | 6/2001 | Dent et al. | 6,463,282 B2 | 10/2002 | Norin et al. |
| 6,246,363 B1 | 6/2001 | Yung et al. | 6,463,294 B1 | 10/2002 | Holma et al. |
| 6,252,915 B1 | 6/2001 | Mollenkopf et al. | 6,466,554 B2 | 10/2002 | Okada |
| 6,257,526 B1 | 7/2001 | Taormina et al. | 6,480,788 B2 | 11/2002 | Kilfeather et al. |
| 6,259,415 B1 | 7/2001 | Kumpfbeck et al. | 6,484,213 B1 | 11/2002 | Nouri |
| 6,266,528 B1 | 7/2001 | Farzaneh | 6,501,941 B1 | 12/2002 | Chang et al. |
| 6,266,533 B1 | 7/2001 | Zadeh et al. | 6,505,795 B1 | 1/2003 | Thompson et al. |
| 6,269,244 B1 | 7/2001 | Alperovich et al. | 6,507,314 B2 | 1/2003 | Chang et al. |
| 6,272,317 B1 | 8/2001 | Houston et al. | 6,507,739 B1 | 1/2003 | Gross et al. |
| 6,289,004 B1 | 9/2001 | Mesecher et al. | 6,513,758 B1 | 2/2003 | Lloyd |
| 6,289,211 B1 | 9/2001 | Koorapaty et al. | 6,526,288 B1 | 2/2003 | Khalifa et al. |
| 6,295,440 B2 | 9/2001 | Chang et al. | 6,529,706 B1 | 3/2003 | Mitchell |
| 6,298,238 B1 | 10/2001 | Dai | 6,547,190 B1 | 4/2003 | Thompson et al. |
| 6,301,231 B1 | 10/2001 | Hassan et al. | 6,556,845 B1 | 4/2003 | Ide et al. |
| 6,301,463 B1 | 10/2001 | Dao et al. | 6,559,797 B1 | 5/2003 | Chang |

| | | | |
|---|---|---|---|
| 6,563,457 B2 | 5/2003 | Chang et al. | |
| 6,567,052 B1 | 5/2003 | Wang et al. | |
| 6,570,858 B1 | 5/2003 | Emmons, Jr. et al. | |
| 6,591,111 B1 | 7/2003 | Stosz et al. | |
| 6,598,014 B1 | 7/2003 | Rabideau et al. | |
| 6,615,024 B1 | 9/2003 | Boros et al. | |
| 2001/0000167 A1 | 4/2001 | Chang et al. | |
| 2001/0038342 A1 | 11/2001 | Foote | |
| 2001/0045903 A1 | 11/2001 | Chang et al. | |
| 2001/0048389 A1 | 12/2001 | Nakagawa | |
| 2002/0006795 A1 | 1/2002 | Norin et al. | |
| 2002/0010757 A1 | 1/2002 | Granik et al. | |
| 2002/0011491 A1 | 1/2002 | Rosen et al. | |
| 2002/0041575 A1 | 4/2002 | Karabinis et al. | |
| 2002/0050946 A1 | 5/2002 | Chang et al. | |
| 2002/0053987 A1 | 5/2002 | Chang et al. | |
| 2002/0072332 A1 | 6/2002 | Chang et al. | |
| 2002/0072360 A1 | 6/2002 | Chang et al. | |
| 2002/0072361 A1 | 6/2002 | Knoblach et al. | |
| 2002/0072374 A1 | 6/2002 | Chang et al. | |
| 2002/0073437 A1 | 6/2002 | Chang et al. | |
| 2002/0080732 A1 | 6/2002 | Feria et al. | |
| 2002/0081969 A1 | 6/2002 | Chang et al. | |
| 2002/0106041 A1 | 8/2002 | Chang et al. | |
| 2002/0107034 A1 | 8/2002 | Chang et al. | |
| 2002/0112171 A1 | 8/2002 | Ginter et al. | |
| 2002/0118654 A1 | 8/2002 | Chang et al. | |
| 2002/0126042 A1 | 9/2002 | Chang et al. | |
| 2002/0128044 A1 | 9/2002 | Chang et al. | |
| 2002/0128045 A1 | 9/2002 | Chang et al. | |
| 2002/0140602 A1 | 10/2002 | Chang et al. | |
| 2002/0146058 A1 | 10/2002 | Feria et al. | |
| 2002/0150067 A1 | 10/2002 | Feria et al. | |
| 2002/0168991 A1 | 11/2002 | Kochanski et al. | |
| 2003/0057329 A1 | 3/2003 | Thompson et al. | |
| 2003/0076258 A1 | 4/2003 | Chang et al. | |
| 2003/0122035 A1 | 7/2003 | Lloyd | |

FOREIGN PATENT DOCUMENTS

| | | |
|---|---|---|
| EP | 0 682 416 A2 | 11/1995 |
| EP | 0 748 062 A | 12/1996 |
| EP | 0 749 252 A | 12/1996 |
| EP | 0 776 099 A2 | 5/1997 |
| EP | 0 837 568 A2 | 4/1998 |
| EP | 0 845 874 A2 | 6/1998 |
| EP | 0 860 708 A2 | 8/1998 |
| EP | 0 860 709 A2 | 8/1998 |
| EP | 0 860 710 A2 | 8/1998 |
| EP | 0 860 952 A | 8/1998 |
| EP | 0 887 951 A2 | 12/1998 |
| EP | 0 961 416 A1 | 12/1999 |
| EP | 1 010 988 A2 | 6/2000 |
| EP | 1 037 403 A2 | 9/2000 |
| EP | 1 091 505 A2 | 4/2001 |
| EP | 1 122 813 A2 | 8/2001 |
| EP | 1 139 583 A2 | 10/2001 |
| EP | 1 148 662 A2 | 11/2001 |
| EP | 1 152 552 A2 | 11/2001 |
| EP | 1 158 698 A2 | 11/2001 |
| EP | 1 161 001 A2 | 12/2001 |
| FR | 2621 132 A | 3/1989 |
| GB | 2 271 902 A | 10/1993 |
| GB | 2 306 827 A | 5/1997 |
| GB | 2 349 045 A | 10/2000 |
| JP | 59-097239 | 6/1984 |
| JP | 02-028580 | 1/1990 |
| JP | 2-28580 | 10/1990 |
| JP | 3-291584 | 12/1991 |
| JP | 04-027887 | 1/1992 |
| JP | 4-27887 | 8/1992 |
| JP | 07146995 A | 6/1995 |
| JP | 08015405 A | 1/1996 |
| JP | 08-331030 | 12/1996 |
| JP | 09026328 | 1/1997 |
| JP | 09113600 A | 5/1997 |
| JP | 10090391 A | 4/1998 |
| JP | 10-209939 | 8/1998 |
| JP | 11-8579 | 1/1999 |
| JP | 20-01345747 A | 12/2001 |
| WO | WO 90/13186 | 11/1990 |
| WO | WO 95/04407 * | 2/1995 |
| WO | WO 96/22661 | 7/1996 |
| WO | WO 96/31016 | 10/1996 |
| WO | WO 97 07609 A | 2/1997 |
| WO | WO 98/02762 A | 1/1998 |
| WO | WO 98/51568 | 11/1998 |
| WO | WO 99/13598 | 3/1999 |
| WO | WO 99/16201 | 4/1999 |
| WO | WO 99/23769 | 5/1999 |
| WO | WO 00/14902 A2 | 3/2000 |
| WO | WO 00/41340 | 7/2000 |
| WO | WO 01/91310 A3 | 11/2001 |
| WO | WO 01/93458 A2 | 12/2001 |
| WO | WO 01/94969 A3 | 12/2001 |
| WO | WO 01/95220 A2 | 12/2001 |
| WO | WO 01/95522 A1 | 12/2001 |
| WO | WO 01/95523 A3 | 12/2001 |
| WO | WO 01/97388 A3 | 12/2001 |
| WO | WO 01/97406 A3 | 12/2001 |
| WO | WO 02/058186 A2 | 7/2002 |
| WO | WO 02/058273 A2 | 7/2002 |

OTHER PUBLICATIONS

U.S. Appl. No. 09/721,854, filed Nov. 22, 2000, Rosen et al.

Agnew et al., "The AMSC Mobile Satellite System", Proceedings of the Mobile Satellite Conference, May 3–5, 1999 NASA, JPL Publication 988–9, pp. 3–9.

D. Ayyagiri et al., "Blocking Analysis and Simulation Studies in Satellite–Augmented Cellular Networks", IEEE, pp. 437–441.

Casewell I.E., "The Provision of GSM Cellular Radio Environments Within Passenger Aircraft Operating Over Europe", Racal Res. Ltd., Walton–On–Thames, Mobile Radio and Personal Communications, 1989, Fifth International Conference, Dec. 11, 1989–Dec. 14, 1989, pp. 172–176.

Divsalar et al., "Trellis Coded MPSK Modulation Techniques for MSAT–X", Proceedings of the Mobile Satellite Conference, May 3–5, 1988, NSA, JPL Publication 988–9, pp. 283–290.

Peter Poskett, "The ICO System For Personal Communications By Satellite", The Institution of Electrical Engineers, Published by the IEE, Savoy Place, London, 1998, pp. 2.1–2.6.

Markus Werner et al., "A Neural Network Approach To Distributed Adaptive Routing of LEO Intersatellite Link Traffic", IEE, 1998, pp. 1498–1502, VTC '98.

Lorel Wirbel, "WDM Moves Into Space For Broadband Laser Links", Nov. 20, 1998, URL:http://www.eetimes.com/story/OEG19981120S0037, pp. 1–2.

H.D. Griffiths et al., "Bistatic Radar Using Satellite–Borne Illuminators of Opportunity", IEEE, Radar 92, International Conference, Brighton, UK, 1992, pp. 276–279.

Colella, Nicholas, "HALO Network—The Birth of Stratospheric Communications Services & the Decline of Satellite Networks", http://www.angelhalo.com/techpaper6, Copyright 1997–1999.

Djuknic, Goran et al., "Establishing Wireless Communications Services via High– Aeronautical platforms: A Concept Whose Time Has Come?" IEEE Communications Magazine, Sep. 1997, pp. 128–135.

Martin, James N. et al., "HALO Network—The Cone of Commerce", http://www.angelhalo.com/techpaper2, copyright 1997–1998.

Martin, James N. et al., "HALO Network—Broadband Wireless Services from High Altitude Long Operation (HALO) Aircraft", http://www.angelhalo.com/techpaper2, copyright 1997–1998.

Akyildiz, Ian F. et al., "HALO (High Altitude Long Operation): A Broadband Wireless Metropolitan Area Network", IEEE International Workshop on Mobile Multimedia Communications, Nov. 1999, pp/. 271–275.

Collela, Nicholas J., et al; "The HAOL Network", IEEE Communications Magazine, Jun. 2000, pp. 142–148.

Colella, Nicholas, J., et al; "High Speed Internet Access Via Stratospheric HALO Aircraft", Jun. 8, 1999; INET'99 Proceedings—Internet Society; Technology, Wireless; 13 Pages.

U.S. Appl. No. 09/576,652, filed May 22, 2000, Hagen et al.
U.S. Appl. No. 09/584,012, filed May 30, 2000, Chang et al.
U.S. Appl. No. 09/576,648, filed May 22, 2000, Yung et al.
U.S. Appl. No. 09/644,225, filed Aug. 21, 2000, Hagen et al.
U.S. Appl. No. 09/587,960, filed Jun. 6, 2000, Yung et al.
U.S. Appl. No. 09/587,759, filed Jun. 6, 2000, Yung et al.
U.S. Appl. No. 09/271,997, filed Mar. 18, 1999, Chang et al.
U.S. Appl. No. 09/209.062, filed Dec. 10, 1998, Yung et al.
U.S. Appl. No. 09/550,505, filed Apr. 17, 2000, Chang et al.
U.S. Appl. No. 08/803,937, filed Feb. 21, 1997, Chang et al.
U.S. Appl. No. 09/669,095, filed Sep. 25, 2000, Yung et al.
U.S. Appl. No. 09/655,041, filed Sep. 5, 2000, Chang et al.
U.S. Appl. No. 08/803,937, filed Jul. 21, 1997, Chang et al.
U.S. Appl. No. 09/611,753, filed Jul. 7, 2000, Chang et al.
U.S. Appl. No. 09/652,862, filed Aug. 31, 2000, Chang et al.
U.S. Appl. No. 09/644,224, filed Aug. 21, 2000, Chang et al.
U.S. Appl. No. 09/661,725, filed Sep. 14, 2000, Chang et al.

Chiba, Isamu et. al, "Digital Beam Forming (DBF) Antenna System for Mobile Communications", IEEE AES Systems Magazine, Sep. 1997, pp. 31–41.

Miura, Ryu et. al, "A DBF Self–Beam Steering Array Antenna for Mobile Satellite Applications Using Beam–space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, Jul. 1992, vol.2, pp. 1073–1076.

Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

Suzuki, R. et. al, :Mobile TDM/TDMA System With Active Array Antenna, Global Telecommunications Conference, 1991; Globecom '91, vol. 3, Dec. 2–5, 1991, pp. 1569–1573.

K. K. Chan, F. Marcoux, M. Forest, L. Martins–Camelo, "A Circularly Polarized Waveguide Array For Leo Satellite Communications", pp. 154–157, IEEE1999 AP–S International Symposium, Jun. 1999.

M. Oodo, R. Miura, Y. Hase, "Onboard DBF Antenna For Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

Teles J et al.: "Overview of TDRSS" Orbit Determination and Analysis. PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.

Bricker, P et al.: "Integrated Receiver for NASA Tracking and Data Relay Satellite System", MILCOM 90. A new Era, 1990 IEEE Military Communications Conference, Monterey, CA, USA, Sep. 30–Oct. 3, 1990, p. 1–5.

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 292–301.

K. H. Bethke, "A Novel Noncooperative Near–Range Radar Network or Traffic Guidance and Control on Airport Surfaces", IEEE Transactions on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

* cited by examiner

CONCURRENT COMMUNICATIONS BETWEEN A USER TERMINAL AND MULTIPLE STRATOSPHERIC TRANSPONDER PLATFORMS

BACKGROUND OF THE INVENTION

The present invention relates generally to stratospheric transponder platform communications systems. More specifically, but without limitation thereto, the present invention relates to an architecture for communicating between a user terminal and multiple stratospheric transponder platforms.

In future stratospheric communications systems, it is expected that multiple stratospheric transponder platforms will be employed by several service providers to transmit communications signals using the same frequency band. The capability of a user terminal receiver on the ground to access different services from multiple stratospheric transponder platforms is important to the viability of the transponder platform system. Although a phased array antenna at the user terminal may be used to steer the beam from one stratospheric platform to another to avoid signal interference, such antennas are too expensive for the mass consumer market. Similarly, using separate antennas to track each stratospheric transponder platform is not practical for low cost terminals. A method is therefore needed for communicating between a user terminal and multiple stratospheric platforms using low cost antennas that do not require either a tracking mechanism or beam forming circuitry.

SUMMARY OF THE INVENTION

The present invention advantageously addresses the needs above as well as other needs by providing a method and apparatus for concurrent communications between a user terminal and multiple stratospheric transponder platforms using inexpensive antennas.

In one embodiment, the invention may be characterized as a method for communicating between a user terminal and multiple stratospheric transponder platforms that includes the steps of maintaining a plurality of stratospheric transponder platforms in a substantially fixed position with respect to a user terminal antenna coupled to a user terminal and communicating between the user terminal and at least two of the plurality of stratospheric transponder platforms concurrently.

In another embodiment, the invention may be characterized as a communications system for communicating between a user terminal and multiple stratospheric transponder platforms that includes a user terminal antenna coupled to a user terminal, a gateway hub for interfacing with a plurality of stratospheric transponder platforms having a substantially fixed position with respect to the user terminal antenna for communicating between the user terminal and each of the plurality of stratospheric transponder platforms concurrently.

The features and advantages summarized above in addition to other aspects of the present invention will become more apparent from the description, presented in conjunction with the following drawings.

BRIEF DESCRIPTION OF THE DRAWINGS

The above and other aspects, features and advantages of the present invention will be more apparent from the following more specific description thereof, presented in conjunction with the following drawings wherein.

Corresponding reference characters indicate corresponding components throughout the several views of the drawings.

DETAILED DESCRIPTION OF THE DRAWINGS

The following description is presented to disclose the currently known best mode for making and using the present invention. The scope of the invention is defined by the claims.

Figure 1:
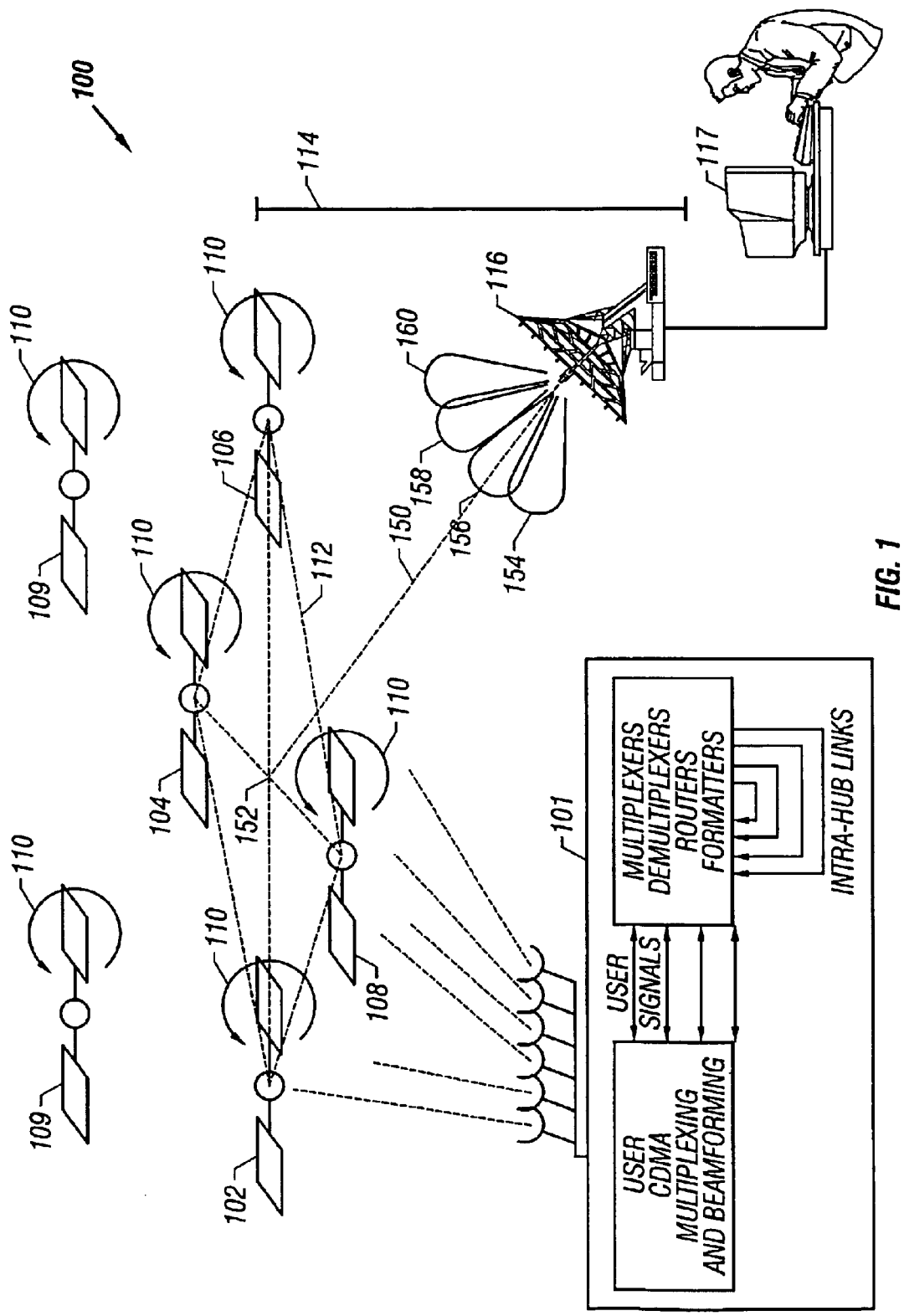
FIG. 1 is a block diagram of a stratospheric transponder platform communications system for communicating between a user terminal and multiple stratospheric transponder platforms concurrently according to an embodiment of the present invention.

FIG. 1 is a diagram of a stratospheric platform communications system 100 for communicating between a user terminal and multiple stratospheric transponder platforms concurrently. Shown are a gateway hub 101, stratospheric transponder platforms 102, 104, 106, and 108, additional stratospheric transponder platforms 109, a platform orbit 110, a platform separation 112, a platform altitude 114, an antenna axis 150, a point 152 at the center of the formation of the stratospheric transponder platforms 102, 104, 106 and 108, a single reflector user terminal antenna 116, a user terminal 117, and four receiving beams 154, 156, 158 and 160.

In this example, the stratospheric transponder platforms 102, 104, 106 and 108 are communications satellites arranged in a substantially fixed, square formation relative to the user terminal antenna 116 and are separated by the platform separation 112 of about 10 km. Alternatively, unmanned aircraft, antenna towers, and other transponder platforms may be used to suit specific applications. Also, more than one gateway hub 101 may be used in conjunction with one or more of the stratospheric transponder platforms 102, 104, 106 and 108 to communicate with the user terminals 117 via the user terminal antenna 116. User terminal 116 is preferably a single reflector, multiple beam antenna, but may also be separate single reflector antennas. The platform separation 112 of 10 km is computed using a platform altitude of 20 km based on interference considerations. The platform altitude 114 of 20 km is preferable for maintaining each of the stratospheric transponder platforms 102, 104, 106 and 108 in a designated orbit because the average wind velocity is at a minimum at that altitude.

To avoid the requirement of a tracking system to track each of the stratospheric transponder platforms 102, 104, 106 and 108, the platform orbit 110 of each of the stratospheric transponder platforms 102, 104, 106, 108 is maintained in a small circle about 2 km in diameter.

In this arrangement, the stratospheric transponder platforms 102, 104, 106 and 108 relay four separate communications signals concurrently between a user terminal via the user terminal antenna 116 and the gateway hub 101. The spatial diversity of the stratospheric transponder platforms 102, 104, 106 and 108 allows the same frequency band to be shared by the four separate communications signals. Thus, the user terminal 117 is capable of receiving communications signals from the stratospheric transponder platforms 102, 104, 106, 108 using the same frequency band and at the same time. Additional stratospheric transponder platforms 109 may be used to communicate between the gateway hub 101 and the user terminal 117 as well as with other user terminals in various combinations to suit a variety of applications.

One method by which separate service providers may use the same frequency band without interfering with one another is to provide the user terminal 117 with a separate single beam reflector antenna 118 for each of the stratospheric transponder platforms 102, 104, 106 and 108. Disadvantages of this method include high cost and the labor time involved in setting up each of the four reflectors.

A preferred method is to implement the user terminal antenna 116 with a single reflector multiple beam antenna. The single reflector multiple beam antenna is aimed along an antenna axis 150 to a point 152 at the center of the formation of the stratospheric transponder platforms 102, 104, 106 and 108. In this example, the user terminal antenna 116 forms four beams 154, 156, 158 and 160 that are offset from the antenna axis 150 and aimed at each of the stratospheric transponder platforms 102, 104, 106 and 108 respectively. For example, the beam 154 is aimed at the stratospheric transponder platform 108, the beam 156 is aimed at the stratospheric transponder platform 102, the beam 158 is aimed at the stratospheric transponder platform 106, and the beam 160 is aimed at the stratospheric transponder platform 104.

In this example the beams 154, 156, 158 and 160 are used for receiving, however, in other contemplated arrangements, the beams 154, 156, 158 and 160 may also be used for transmitting communications signals to the stratospheric transponder platforms 102, 104, 106 and 108.

Figure 2:
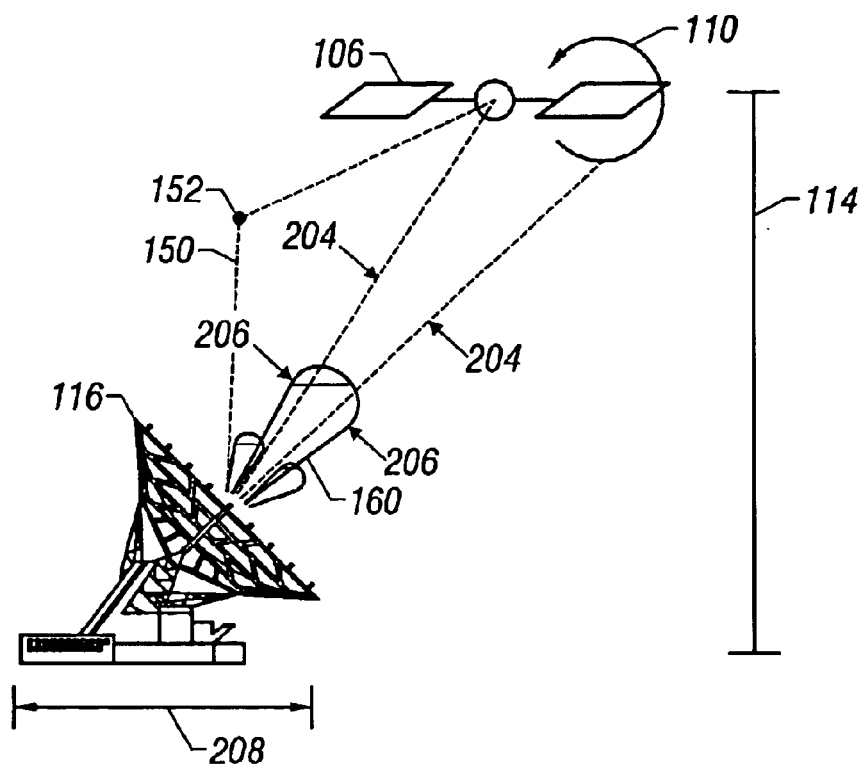
FIG. 2 is a detailed diagram of one of the multiple beams in FIG. 1.

FIG. 2 is a detailed diagram of one of the beams shown in FIG. 1. The description below for the beam 160 is also applicable to the beams 154, 156, and 158. The diameter of the platform orbit 110 and the platform altitude 114 of the stratospheric transponder platform 102 determines a half-power beam width (HPBW) 206 and a reflector diameter 208 of the single reflector multiple beam antenna. Because the diameter of the platform orbit 110 is small compared to the platform altitude 114, the location of the single reflector multiple beam antenna within the service area of the stratospheric transponder platforms 102, 104, 106 and 108 is not critical, as long as the antenna axis 150 points in the direction of the point 152 at the center of the formation of the stratospheric transponder platforms 102, 104, 106 and 108.

An orbit angle 204 subtended by the platform orbit 110 at the platform altitude 114 in this example is approximately 5.5°. To ensure that the stratospheric transponder platform 106 will always be near the peak of the single beam 160, the half-power beam width 206 is preferably twice the platform orbit angle 204 as viewed from the single reflector multiple beam antenna, i.e., $$HPBW \approx 2 \times 5.5° = 11° \quad (1)$$

This beam width allows the single beam 160 to track the stratospheric transponder platform 106 without a tracking mechanism. The diameter D of the reflector for the single reflector multiple beam antenna may be found by $$D = 65\lambda/HPBW \approx 90 \text{ cm} \quad (2)$$

where λ is the wavelength, which is about 15 cm at 2 GHz.

Once the reflector diameter 208 of the single reflector multiple beam antenna is determined, the platform separation 112 between the stratospheric transponder platforms 102, 104, 106 and 108 for forming multiple beams may be determined from interference considerations. For example, a convenient design criterion is that the stratospheric transponder platforms 102, 104, 106 and 108 be at least 2×HPBW apart to ensure that the signal to interference ratio is at least 20 dB between any two of the beams 154, 156, 158 and 160.

Table 1 below illustrates a typical platform separation vs. beam spacing for the single reflector multiple beam antenna 116 in FIG. 1. As shown in Table 1, increasing the separation between stratospheric transponder platforms 102, 104, 106 and 108 over the range from 8 km to 12 km increases the angle between adjacent beams, or beam spacing, from 22° to 33°.

TABLE 1

| BEAM SPACING | PLATFORM SEPARATION |
| --- | --- |
| 22°/2 HPBW | 8 Km |
| 28°/2.6 HPBW | 10 Km |
| 33°/3.0 HPBW | 12 Km |

Table 2 below illustrates a typical platform separation vs. signal-to-interference ratio for the single reflector multiple beam antenna 116 in the system of FIG. 1. As shown in Table 2, increasing the platform separation over the range from 8 km to 12 km increases the signal-to-interference ratio from 20 dB to 29 dB.

TABLE 2

| SIGNAL-TO-INTERFERENCE POWER RATIO | PLATFORM SPACING |
| --- | --- |
| 20 dB | 8 Km |
| 23 dB | 10 Km |
| 29 dB | 12 Km |

Figure 3:
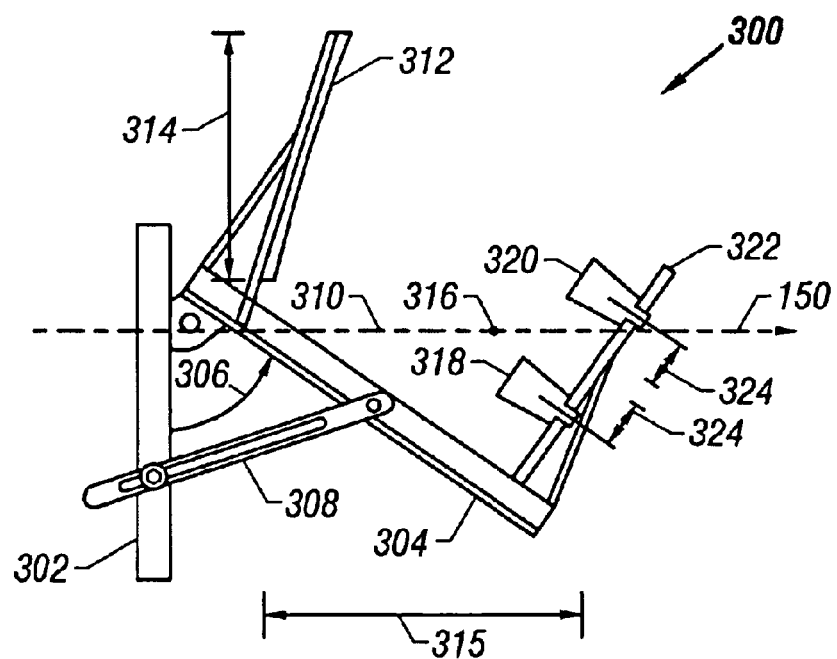
FIG. 3 is a detailed diagram of a single reflector multiple beam antenna according to an embodiment of the present invention for forming two of the beams shown in FIG. 1.

FIG. 3 is a diagram of a single reflector multiple beam antenna 300 for forming two of the beams shown in FIG. 1. The other two beams are omitted for clarity, however, the same description applies for adding additional beams. Shown are an antenna mast 302, an antenna mount 304, a tilt angle 306, a tilt arm 308, an antenna axis 310, an antenna reflector 312, an antenna diameter 314, a focal point 316, a focal length 315, two feedhorns 318 and 320, a beam spacing mount 322, and an offset 324.

The antenna mast 302 supports the antenna mount 304. The antenna mount 304 has a tilt angle 306 that may be adjusted by the tilt arm 308 to aim the single reflector multiple beam antenna 300 at the point 152 at the center of the formation of the stratospheric transponder platforms 102, 104, 106 and 108 along the antenna axis 150. The antenna reflector 312 is mounted at one end of the antenna mount 304. The antenna diameter 314 is determined as explained above. The focal point 316 of the antenna reflector 312 is located at a distance equal to the focal length 315 from the antenna reflector 312. The beam spacing mount 322 is mounted at the end of the antenna mount 304 opposite to the antenna reflector 312. The two feedhorns 318 and 320 are positioned on the beam spacing mount 322 so that they are each displaced from the focal point 316 by the offset 324 to form two separate beams point respectively at two of the stratospheric transponder platforms 102, 104, 106 and 108. Additional beams may be formed by adding feedhorns on the beam spacing mount 322 at positions offset from the focal point 316 as described above for the feedhorns 318 and 320.

Locating the feedhorns 318 and 320 offset from focal point 316 to form multiple beams provides a low cost alternative to reflector antennas that locate a single feedhorn at the focal point to form a single beam. Exemplary design values for the single reflector multiple beam antenna 116 are 90 cm for the diameter D, 102 cm for the focal length 315, and 22 cm for the offset 324.

Figure 4A:
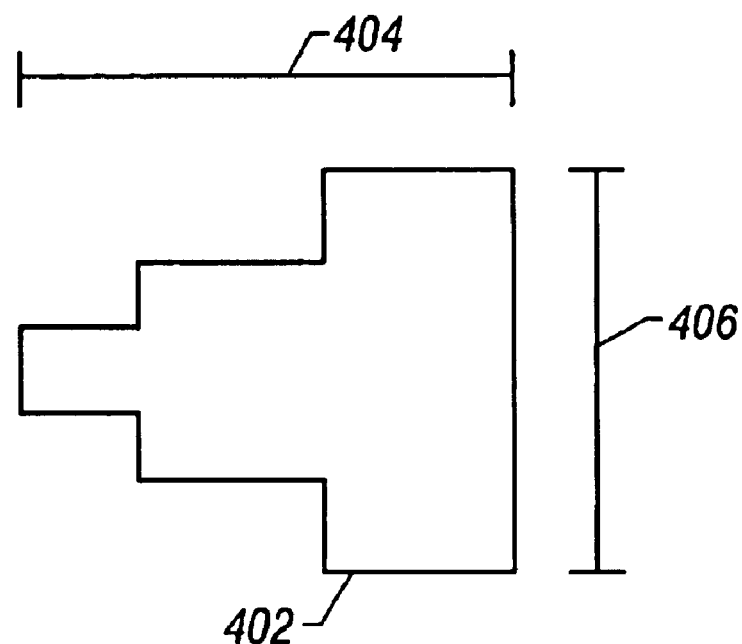
FIGS. 4A and 4B are side views of exemplary feedhorn shapes for the single reflector multiple beam antenna of FIG. 3.
Figure 4B:
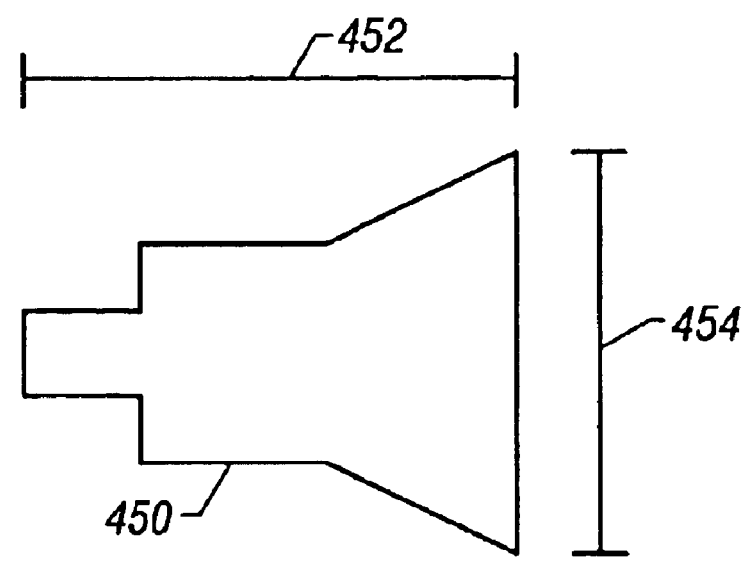

FIGS. 4A and 4B are side views of exemplary feedhorn designs for the reflector antenna of FIG. 3. FIG. 4A illustrates a stepped feedhorn 402 having a length 404 and an aperture 406. An exemplary value for both the length 404 and the aperture 406 is 22 cm. FIG. 4B illustrates a stepped and tapered feedhorn 450 having a length 452 and an aperture 454. Exemplary values for the length 452 and the aperture 454 are 27 cm and 22 cm, respectively.

Figure 5:
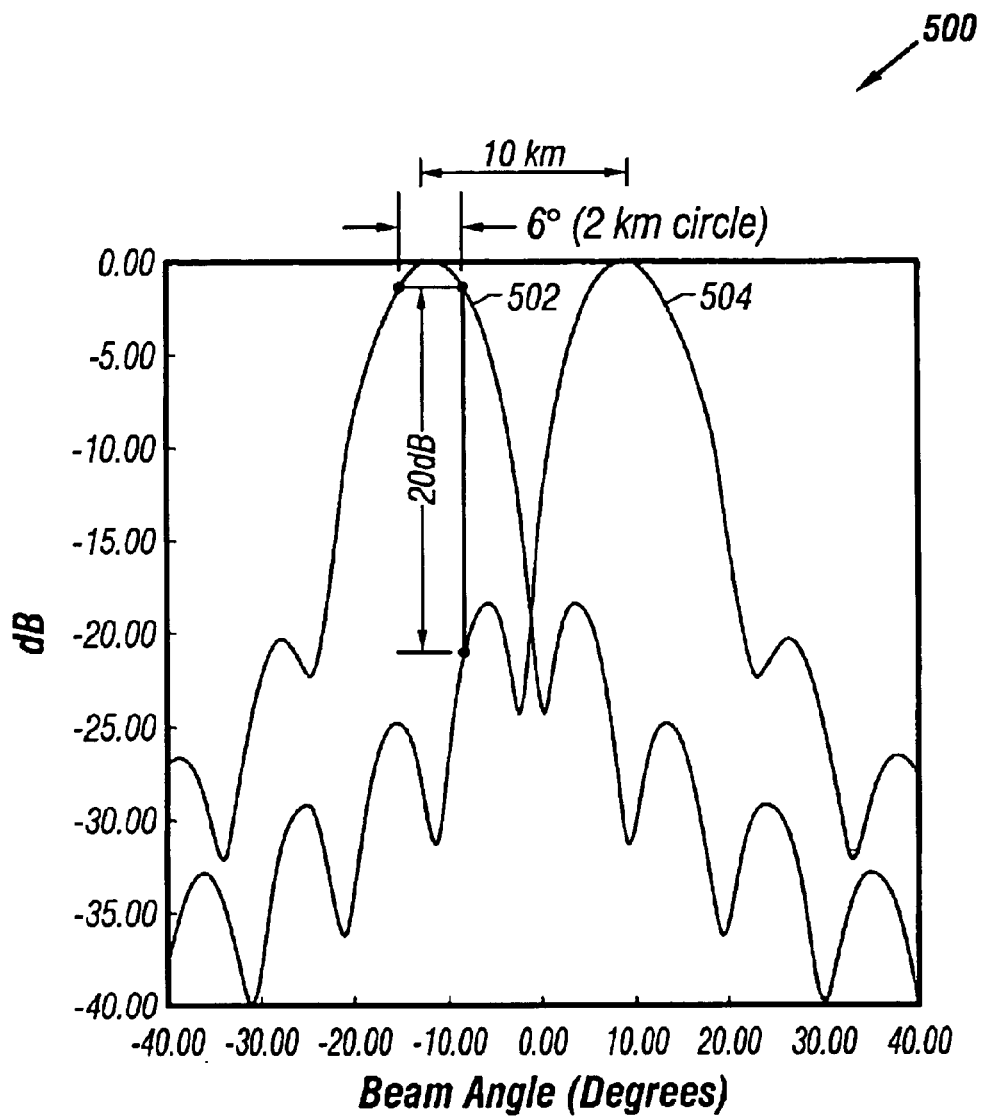
FIG. 5 is a beam plot of the beams formed by the single reflector multiple beam antenna of FIG. 3.

FIG. 5 is a beam plot 500 of multiple beams 502 and 504 formed by the reflector antenna 116 of FIG. 3. The two peak responses 502 and 504 are spaced 22° apart and are representative of any two of the multiple beams 154, 156, 158 and 160. The signal-to-interference noise ratio is 20 dB for a beam spacing of 22° corresponding to a platform orbit diameter of 2 km and a platform separation of 8 km as shown in table 1.

Figure 6:
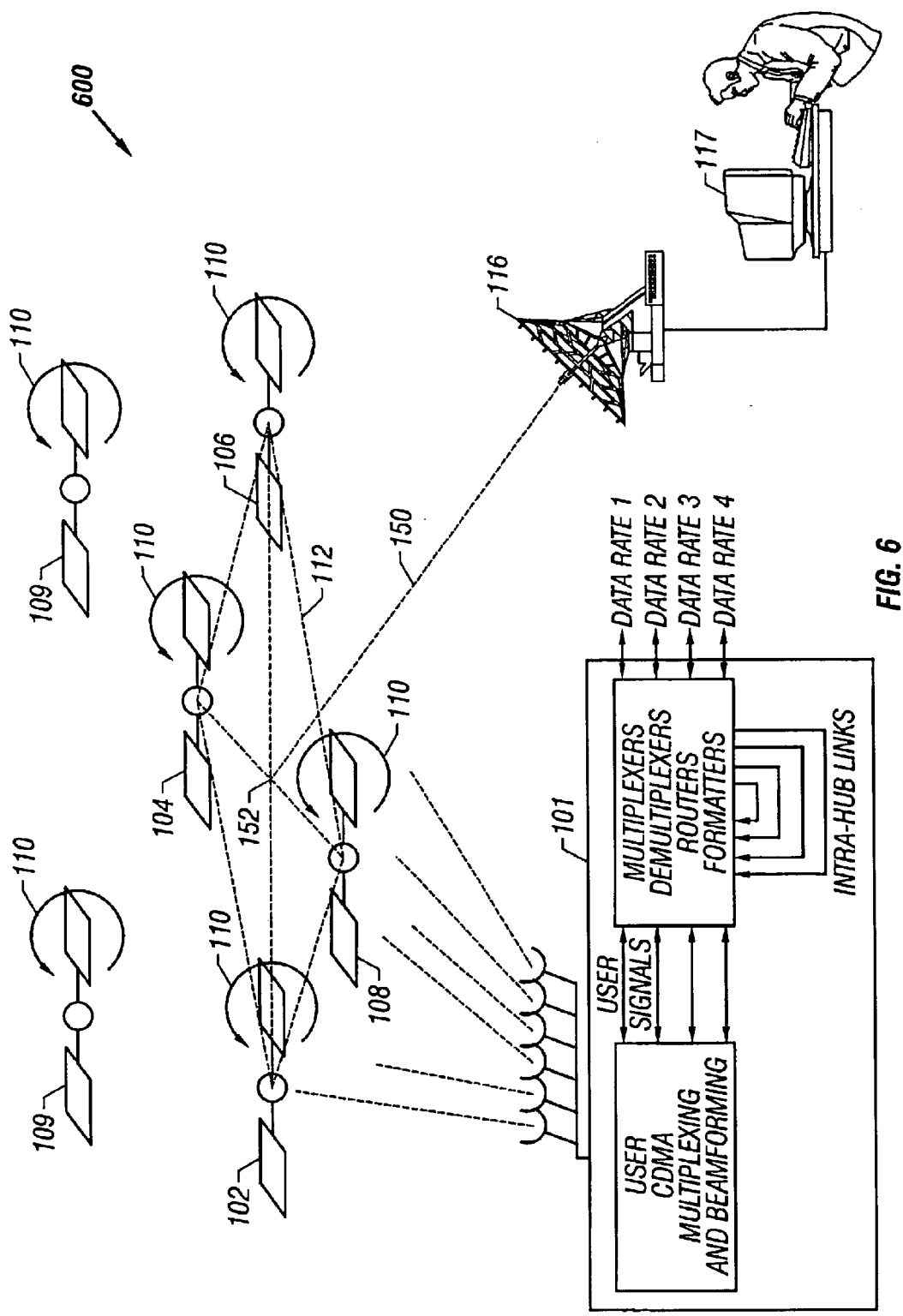
FIG. 6 is a diagram of a communications system according to another embodiment of the present invention for providing multiple data rates.

FIG. 6 is a diagram of a communications system 600 for providing multiple data rates. Shown are the gateway hub 101, the stratospheric transponder platforms 102, 104, 106, and 108, the user terminal antenna 116, and the user terminal 117. In this example, the gateway hub interfaces to communications signal sources having separate data rates.

The single reflector multiple beam antenna described above may be used in this example as the user terminal antenna 116. The user terminal antenna 116 is coupled to the user terminal 117 for communicating with the gateway hub 101 using a separate data rate via each of the stratospheric transponder platforms 102, 104, 106, and 108. The user terminal 117 may include signal amplifier/pre-amplifiers (not shown) for pre-amplifying received signals and amplifying transmitted signals from the user terminal 117 according to standard techniques well known in the art. Alternatively, the signal amplifier/pre-amplifiers may be included with the user terminal antenna 116. The user terminal 117 may also include a multiplexer/demultiplexer (not shown) for separating and mixing the communications signals to and from the stratospheric transponder platforms 102, 104, 106, and 108 according to well known techniques. Each of the communications signals may have a separate data rate, and the communications signals may also share the same frequency band concurrently.

Figure 7:
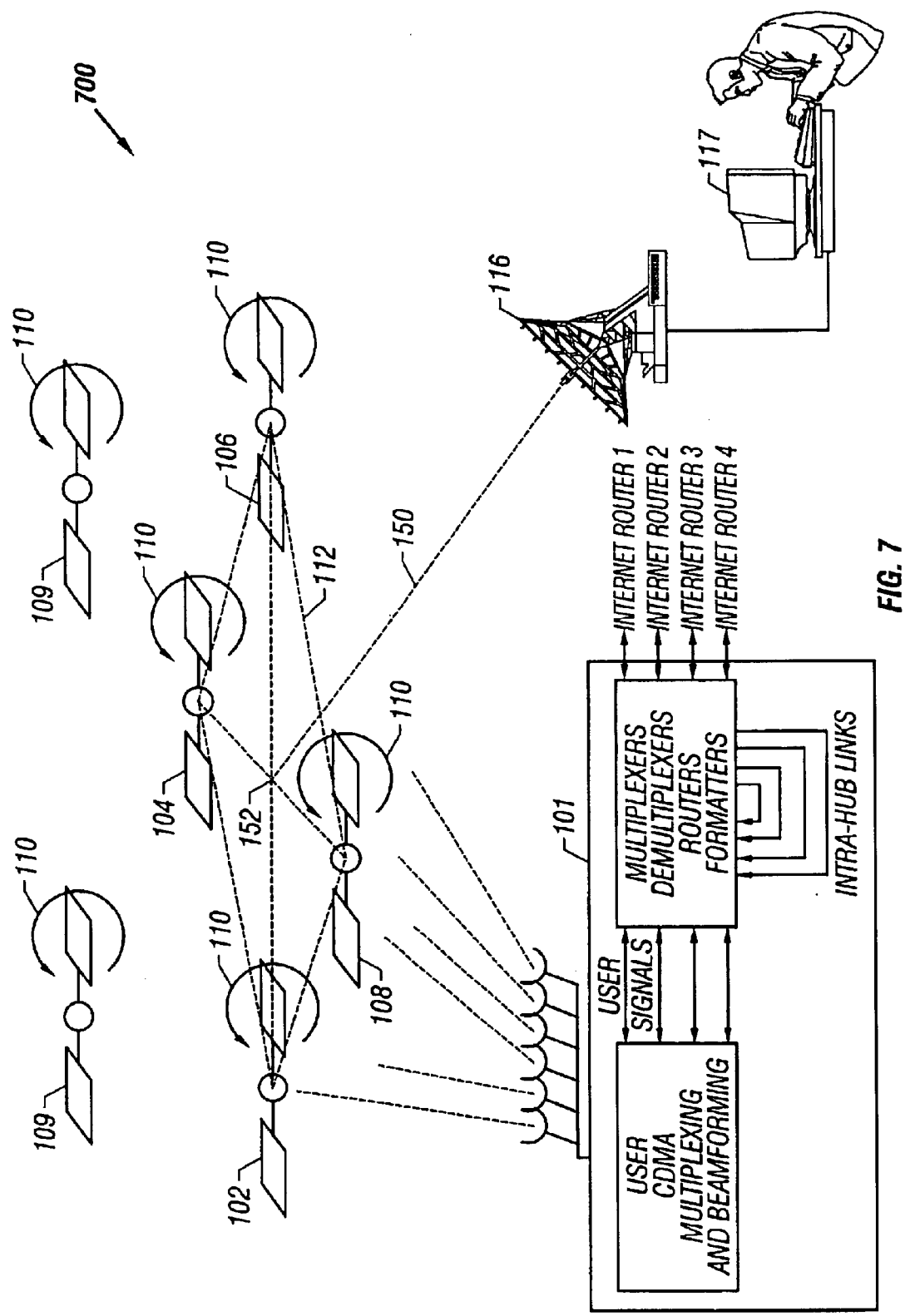
FIG. 7 is a diagram of a communications system according to a further embodiment of the present invention for accessing multiple Internet routers.

FIG. 7 is a diagram of a communications system 700 according to a further embodiment of the present invention for accessing multiple Internet routers concurrently.

The communications system 700 is similar in structure to the communications system 600 in FIG. 6, except that the gateway hub 101 interfaces to the Internet via separate Internet routers. By accessing the Internet through multiple routers, the user terminal 117 can increase data throughput and accommodate individual router and transponder platform failures without interruption of service. If any of the routers or stratospheric transponder platforms should fail, Internet traffic would continue through the operational routers and stratospheric transponder platforms according to standard network management techniques for Internet traffic such as packet assemblers and sequencers.

Figure 8:
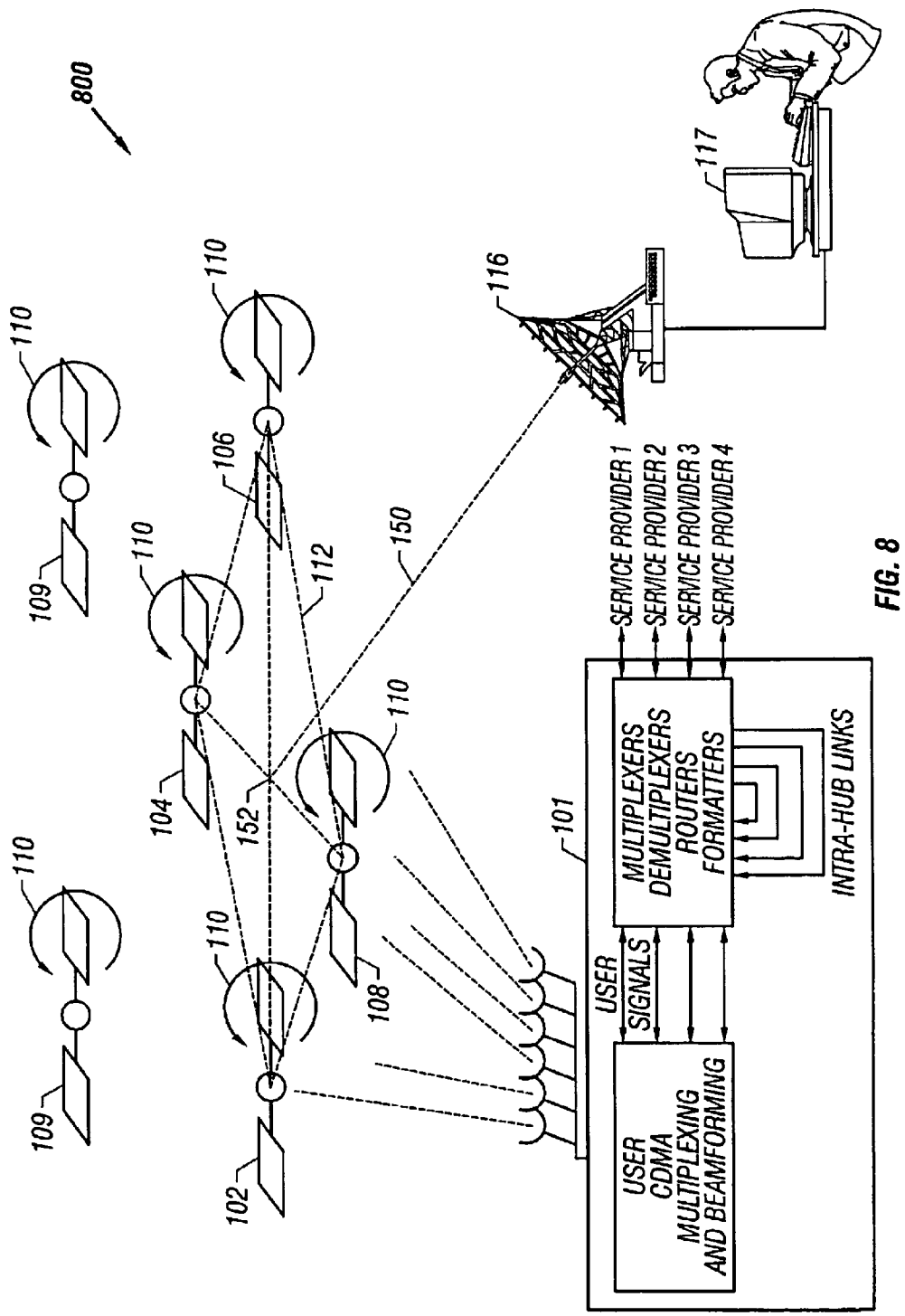
FIG. 8 is a detailed block diagram of the communications system of FIG. 1.

FIG. 8 is a diagram of a communications system 800 for receiving multiple channels from separate communications service providers concurrently.

The communications system 800 is similar in structure to the communications system 600 in FIG. 6, except that the gateway hub 101 interfaces to separate communications service providers for communicating on multiple channels concurrently using the same frequency band.

Other modifications, variations, and arrangements of the present invention may be made in accordance with the above teachings other than as specifically described to practice the invention within the spirit and scope defined by the following claims.

What is claimed is:

1. A method for communicating between a user terminal and multiple stratospheric transponder platforms comprising the following steps:

maintaining the stratospheric transponder platforms in a substantially fixed position with respect to a user terminal antenna coupled to a user terminal so that the user terminal antenna does not have to track the stratospheric platforms; and communicating separate and different communications signals between the user terminal and at least two of the stratospheric transponder platforms concurrently.

2. The method of claim 1 wherein the user terminal communicates with at least two of the stratospheric transponder platforms using the same frequency band.

3. The method of claim 1 wherein the user terminal communicates with one of the at least two of the stratospheric transponder platforms at a first data rate and with another of the at least two of the stratospheric transponder platforms at a second data rate.

4. A method for communicating between a user terminal and multiple stratospheric transponder platforms comprising the following steps:

maintaining the stratospheric transponder platforms in a substantially fixed position with respect to a user terminal antenna to a user terminal; and communicating between the user terminal and at least two of the stratospheric transponder platforms concurrently, wherein the user terminal communicates with a first Internet router via one of the at least two of the stratospheric transponder platforms and with a second Internet router via another of the at least two of the stratospheric transponder platforms.

5. A method for communicating between a user terminal and multiple stratospheric transponder platforms comprising the following steps:

maintaining the stratospheric transponder platforms in a substantially fixed position with respect to a user terminal antenna coupled to a user terminal; and communicating between the user terminal and at least two of the stratospheric transponder platforms concurrently, wherein the user terminal communicates with a first media service provider via one of the at least two of the stratospheric transponder platforms and with a second media service provider via another of the at least two of the stratospheric transponder platforms.

6. A communications system for communicating between a user terminal and multiple stratospheric transponder platforms comprising:

a user terminal antenna coupled to a user terminal; and a plurality of stratospheric transponder platforms having a substantially fixed position with respect to the user terminal antenna for communicating separate and different communications signals between the user terminal and each of the plurality of stratospheric transponder platforms concurrently, the position with respect to the user terminal antenna being such that said user terminal antenna does not have to track the stratospheric platforms.

7. The communications system of claim 6 wherein the user terminal antenna communicates with at least two of the plurality of stratospheric transponder platforms using the same frequency band.

8. The communications system of claim 6 wherein the user terminal antenna communicates with one of the plurality of stratospheric transponder platforms at a first data rate and with another of the plurality of stratospheric transponder platforms at a second data rate.

9. A communications system for communicating between a user terminal and multiple stratospheric transponder platforms comprising:

a user terminal antenna coupled to a user terminal; and a plurality of stratospheric transponder platforms having a substantially fixed position with respect to the user terminal antenna for communicating between the user terminal and each of the plurality of stratospheric transponder platforms concurrently, wherein the user terminal antenna communicates with one of a plurality of Internet routers via one of the plurality of stratospheric transponder platforms and with another of the plurality of Internet routers via another of the plurality of stratospheric transponder platforms.

10. A communications system for communicating between a user terminal and multiple stratospheric transponder platforms comprising:

a user terminal antenna coupled to a user terminal; and a plurality of stratospheric transponder platforms having a substantially fixed position with respect to the user terminal antenna for communicating between the user terminal and each of the plurality of stratospheric transponder platforms concurrently, wherein the user terminal antenna communicates with one of a plurality of communications service providers via one of the plurality of stratospheric transponder platforms and with another of the plurality of communications service providers via another of the plurality of stratospheric transponder platforms.

11. A communications system for communicating between a user terminal and multiple stratospheric transponder platforms comprising:

a user terminal antenna coupled to a user terminal; and a plurality of stratospheric transponder platforms having a substantially fixed position with respect to the user terminal antenna for communicating between the user terminal and each of the plurality of stratospheric transponder platforms concurrently, wherein the user terminal antenna comprises:
a single antenna reflector having a focal length and a focal point;
and at least two feedhorns coupled to the single antenna reflector for forming multiple beams.

12. The communications system of claim 11 wherein the at least two feedhorns are coupled to the single antenna reflector at a distance substantially equal to the focal length and are offset from the focal point by a distance selected to form the multiple beams.

13. The communications system of claim 11 wherein the multiple beams are equally spaced.

14. The communications system of claim 11 wherein one of the at least two feedhorns is a stepped feedhorn.

15. The communications system of claim 11 wherein one of the at least two feedhorns is a stepped and tapered feedhorn.

16. The communications system of claim 11 wherein at least one of the multiple beams has a half-power beam width substantially equal to twice an orbit angle subtended by a stratospheric platform.

17. The communications system of claim 11 wherein the stratospheric transponder platforms have a platform spacing selected to maintain a signal-to-interference ratio of at least 20 dB.

18. The communications system of claim 11 wherein the stratospheric transponder platforms have an orbit diameter selected to maintain the stratospheric transponder platforms respectively near a peak of each of the multiple beams.

19. The communications system of claim 11 wherein the multiple beams have a spacing such that the signal-to-interference ratio between beams is at least 20 dB.

20. A method for communicating between a user terminal and multiple stratospheric transponder platforms comprising the following steps:

maintaining a plurality of stratospheric transponder platforms at a substantially constant platform altitude, platform spacing, and platform orbit diameter and positioned with respect to an user terminal antenna coupled to the user terminal such that the user terminal antenna does not have to track the stratospheric platforms; and communicating separate and different communications signals between each of the plurality of stratospheric transponder platforms and the user terminal on multiple beams concurrently via the user terminal antenna coupled to the user terminal.

21. The method of claim 20 wherein the step of communicating comprises communicating between the user terminal and each of the plurality of stratospheric transponder platforms using the same frequency band.

22. A method for communicating between a user terminal and multiple stratospheric transponder platforms comprising the following steps:

maintaining a plurality of stratospheric transponder platforms at a substantially constant platform altitude, platform spacing, and platform orbit diameter; and communicating between each of the plurality of stratospheric transponder platforms and a user terminal on multiple beams concurrently via a user terminal antenna coupled to the user terminal, and further comprising the step of separating the multiple beams such that the signal-to-interference ratio between any two of the multiple beams is at least 20 dB.

23. A method for communicating between a user terminal and multiple stratospheric transponder platforms comprising the following steps:

maintaining a plurality of stratospheric transponder platforms at a substantially constant platform altitude, platform spacing, and platform orbit diameter; and communicating between each of the plurality of stratospheric transponder platforms and a user terminal on multiple beams concurrently via a user terminal antenna coupled to the user terminal, and wherein the platform spacing is at least two half-power beam widths.

24. A method for communicating between a user terminal and multiple stratospheric transponder platforms comprising the following steps:

maintaining a plurality of stratospheric transponder platforms at a substantially constant platform altitude, platform spacing, and platform orbit diameter; and communicating between each of the plurality of stratospheric transponder platforms and a user terminal on multiple beams concurrently via a user terminal antenna coupled to the user terminal, wherein the step of communicating comprises communicating between the user terminal and each of the plurality of stratospheric transponder platforms using the same frequency band, and wherein the platform orbit diameter is selected to maintain each of the stratospheric transponder platforms near a peak of the multiple beams respectively.

25. A communication system comprising:

at least one gateway hub;

an user terminal antenna with a reflector; and a plurality of transponder platforms arranged in a substantially fixed formation relative to the user terminal antenna, for transmitting communications signals between the gateway hub and the user terminal antenna, wherein each of the plurality of transponder platforms has a platform orbit and a platform separation determined by a desired signal-to-interference power ratio, and wherein the reflector has a diameter such that each of the plurality of transponder platforms is substantially always near the peak of a respective beam of the reflector.

26. The communication system of claim 25, wherein an axis of the user terminal antenna points in the direction of a point at the center of the substantially fixed formation of the plurality of transponder platforms.

27. The communication system of claim 25, wherein the platform orbit of each of the plurality of transponder platforms is small compared to a platform altitude.

28. The communication system of claim 27, wherein the user terminal antenna is a single reflector multiple beam antenna.

29. The communication system of claim 28, wherein each of the plurality of transponder platforms has an orbit angle subtended by the respective platform orbit at the respective platform altitude, and a respective half-power beam width of the single reflector multiple beam antenna is about twice the respective orbit angle when viewed from the single reflector multiple beam antenna.

30. The communication system of claim 29, wherein the platform separation is at least twice a half-power beam width (HPBW) of the single reflector multiple beam antenna.

31. The communication system of claim 30, wherein a beam spacing of the user terminal is at least twice the HPBW.

32. The communication system of claim 25, wherein the plurality of transponder platforms comprises four transponder platforms arranged in a square formation relative to the user terminal antenna and the platform separation between any two of the four transponder platforms on a side of the square is about 10 km and the four transponder platforms are at an altitude of about 20 km.

33. The communication system of claim 32, wherein a diameter of the platform orbit is about 2 km.

34. The communication system of claim 25, wherein the platform separation is increased to achieve a higher signal-to-interference power ratio and decreased to achieve a lower signal-to-interference power ratio.

35. The communication system of claim 25, wherein the user terminal antenna and at least one router of a plurality of Internet routers communicate via one of the plurality of transponder platforms and the at least one gateway hub and the user terminal antenna and at least another router of the plurality of Internet routers communicate via another of the plurality of transponder platforms and the at least one gateway hub.

36. The communication system of claim 35, wherein the user terminal antenna communicates with the at least one router and at least another router concurrently.

37. The communication system of claim 25 wherein the at least one gateway hub interfaces to communications signal sources having separate data rates.

38. The communication system of claim 25 wherein the at least one gateway hub interfaces with multiple communications service providers for communicating on multiple channels with the user terminal antenna concurrently using a same frequency band.

39. The communication system of claim 25, wherein the user terminal antenna and one provider of a plurality of communications service providers communicate via one of the plurality of transponder platforms and the user terminal antenna and another provider of the communications service providers communicate via another of the plurality of transponder platforms concurrently.

40. The communication system of claim 25, wherein the reflector comprises a single reflector having a focal length and a focal point; and the user terminal antenna further comprises at least two feedhorns coupled to the single reflector for forming multiple beams.

41. The communication system of claim 40, wherein the at least two feedhorns are coupled to the single reflector at a distance and offset from the focal point by a distance to form the multiple beams.

42. The communication system of claim 40, wherein the multiple beams are equally spaced.

43. The communication system of claim 40, wherein at least one of the at least two feedhorns is a stepped feedhorn.

44. The communication system of claim 40, wherein at least one of the at least two feedhorns is a stepped and tapered feedhorn.

45. The communication system of claim 25 wherein the plurality of transponder platforms comprise satellites.

46. The communication system of claim 25 wherein the plurality of transponder platforms comprises unmanned aircraft.

47. The communication system of claim 25 wherein the plurality of transponder platforms comprises antenna towers.

48. A communication system comprising:

an user terminal;

an user terminal antenna coupled to the user terminal; and a plurality of transponder platforms arranged relative to the user terminal antenna, each of the plurality of transponder platforms having a platform orbit that is small compared to a platform altitude, and a platform separation determined by a desired signal-to-interference ratio, the user terminal antenna comprising a reflector, the platform orbit of each of the plurality of transponder platforms being near the peak of a beam of the reflector, and wherein an axis of the user terminal antenna points in the direction of a point between the plurality of transponder platforms such that the user terminal antenna is capable of receiving and transmitting separate communications signals concurrently via at least two of the plurality of transponder platforms without having to track the at least two of the plurality of transponder platforms.

49. The communication system of claim 48, wherein the user terminal antenna is a single reflector multiple beam antenna.

50. The communication system of claim 48, wherein the user terminal comprises a separate single beam reflector antenna for each of the plurality of transponder platforms.

51. The communication system of claim 49, wherein each of the plurality of transponder platforms has an orbit angle subtended by the respective platform orbit at the respective platform altitude, and a respective half-power beam width (HPBW) of the single reflector multiple beam antenna is about twice the respective orbit angle when viewed from the single reflector multiple beam antenna.

52. The communication system of claim 51, wherein the platform separation is at least twice the HPBW of the single reflector multiple beam antenna.

53. The communication system of claim 48, wherein the plurality of transponder platforms comprises four transponder platforms arranged in a square formation and the platform separation between any two of the four transponder platforms on a side of the square is about 10 km and the platform altitude is about 20 km.

54. The communication system of claim 53, wherein a diameter of the platform orbit is about 2 km.

55. The communication system of claim 52, wherein a beam spacing of the user terminal antenna is at least twice the HPBW.

56. The communication system of claim 48, wherein the platform separation is increased to achieve a higher signal-to-interference ratio and decreased to achieve a lower signal-to-interference ratio.

57. The communication system of claim 48, wherein the user terminal antenna and one router of a plurality of Internet routers communicate via one platform of the plurality of transponder platforms and the user terminal antenna and another router of the plurality of Internet routers communicate via another platform of the plurality of transponder platforms.

58. The communication system of claim 48, further comprising at least one gateway hub, and wherein the user terminal antenna and one provider of a plurality of communications service providers communication via one platform of the plurality of transponder platforms and at least one gateway hub and the user terminal antenna and another provider of the plurality of communications service providers communicate via another platform of the plurality of transponder platforms and the at least one gateway hub.

59. The communication system of claim 58, wherein the communications between the user terminal antenna and the one provider and the another provider take place concurrently.

60. The communication system of claim 48, further comprising at least one gateway hub and wherein the plurality of transponder platforms relay a plurality of separate communications signals concurrently between the user terminal antenna and the at least one gateway hub.

61. A method of communicating multiple communication signals between at least one gateway hub, via multiple transponder platforms, and at least one user terminal coupled to at least one user terminal antenna with a reflector, comprising:

arranging the multiple transponder platforms in a substantially fixed formation relative to the user terminal antenna having a platform separation selected to achieve a desired signal-to-interference ratio, and selecting a size of the reflector such that a platform orbit of each of the multiple transponder platforms is substantially always near the peak of a beam of the reflector.

62. The method of claim 61, further comprising arranging the multiple transponder platforms so as to have a spatial diversity suitable for relaying the multiple communication signals using the same frequency band.

63. The method of claim 61, further comprising transmitting the multiple communication signals at multiple data rates from the at least one gateway hub.

64. The method of claim 63, wherein transmitting the multiple communication signals at multiple data rates comprises interfacing the at least one gateway hub to communications signal sources having separate data rates.

65. The method of claim 64, further comprising transmitting the multiple communication signals concurrently using the same frequency band.

66. The method of claim 61, further comprising pre-amplifying the multiple communication signals received at the at least one user terminal antenna.

67. The method of claim 66, wherein the pre-amplifying comprises pre-amplifying in the at least one user terminal antenna.

68. The method of claim 61, further comprising amplifying transmitted multiple communication signals transmitted from the at least one user terminal antenna.

69. The method of claim 68, wherein the amplifying comprises amplifying in the at least one user terminal antenna.

70. The method of claim 66, further comprising separating the multiple communication signals received by the at least one user terminal antenna.

71. The method of claim 68, further comprising mixing the multiple communication signals transmitted from the at least one user terminal antenna.

72. The method of claim 61, further comprising concurrently providing communication signals from an Internet via multiple Internet routers through the at least one gateway hub and respective multiple transponder platforms to the at least one user terminal.

73. The method of claim 68, wherein the step of concurrently providing comprises interfacing the at least one gateway hub to the Internet via the multiple Internet routers.

74. The method of claim 73, further comprising, in the event of failure of one of the multiple transponder platforms or one of the multiple Internet routers, communicating with the other ones of the multiple transponder platforms or multiple Internet routers.

75. The method of claim 61, wherein the multiple communications signals are received by the at least one user terminal antenna on multiple channels from separate communications service providers.

76. The method of claim 75, wherein the multiple communications signals are received by the at least one user terminal antenna from separate communications service providers by interfacing the at least one gateway hub to the separate communications service providers.

77. The method of claim 76 wherein the multiple communications signals are received by the at least one user terminal at the same frequency band.

78. A single reflector multiple beam antenna for forming multiple beams for a stratospheric transponder platform communication system comprising:

the reflector having a diameter (D) given by the equation:

D=65λ/HPBW, where λ is a wavelength, and HPBW is a half-power beam width of the antenna which is a function of an orbit angle subtended by an orbit of the stratospheric transponder platform at a platform altitude;

an antenna mount, the reflector being mounted at an end of the antenna mount and having a focal point;

a beam spacing mount mounted at another end of the antenna mount opposite to the reflector;

at least two feedhorns positioned on the beam spacing mount displaced from the focal point of the reflector by an offset;

an antenna mast supporting the antenna mount, and a tilt arm for adjusting a tilt angle of the antenna mount.

79. The antenna of claim 78, wherein the HPBW is approximately twice the orbit angle.

80. The antenna of claim 78, wherein the at least two feedhorns are each capable of forming separate beams pointed respectively at at least two stratospheric transponder platforms.

* * * * *